Feb. 7, 1956
C. H. SMOOT ET AL
2,733,608
FORCE RESPONSIVE CONTROL MECHANISM
Filed Jan. 26, 1952
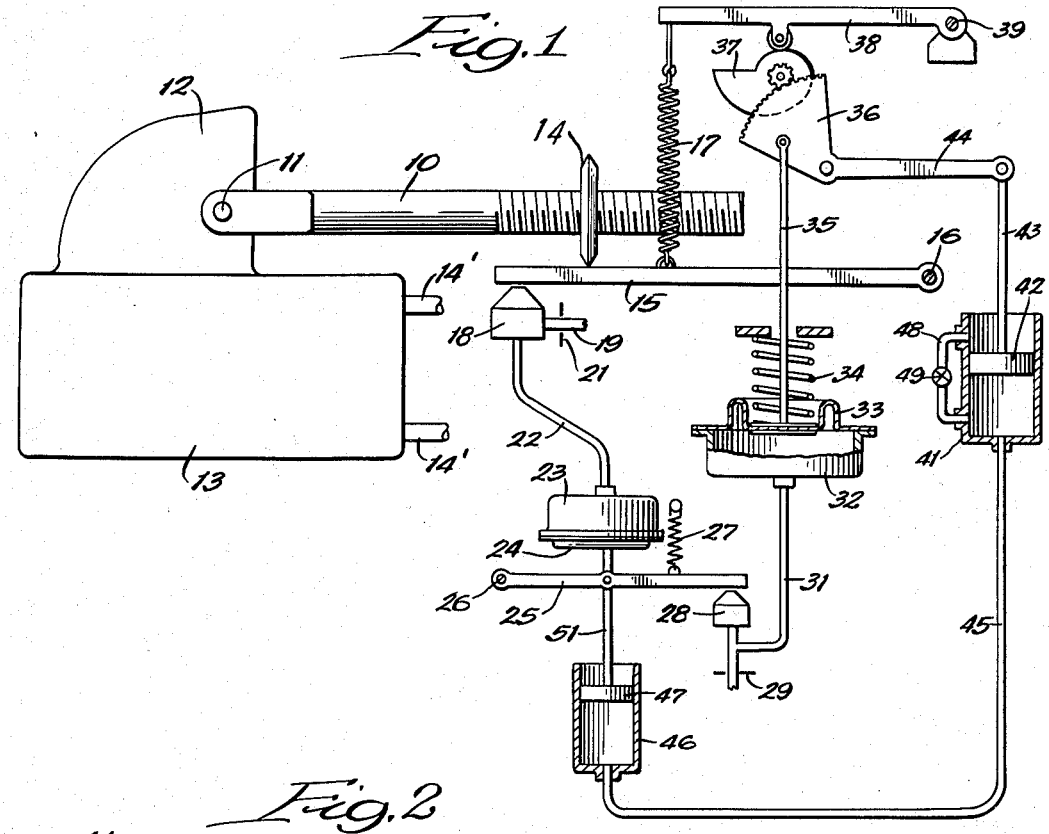
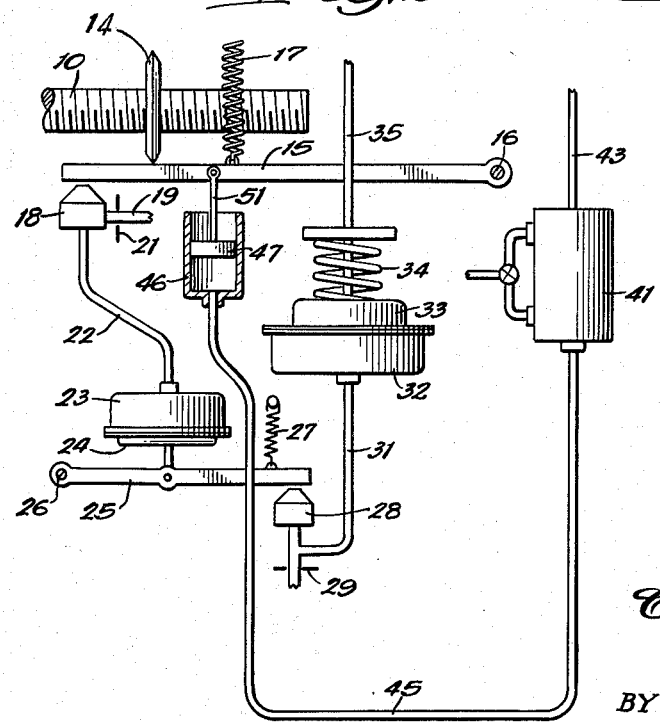
INVENTORS:
Charles H. Smoot and
Nicholas A. Philips,
BY E. S. Broth,
ATTORNEY.

United States Patent Office 2,733,608
Patented Feb. 7, 1956

2,733,608

FORCE RESPONSIVE CONTROL MECHANISM

Charles H. Smoot and Nicholas A. Philips, Chicago, Ill., assignors to Republic Flow Meters Company, Chicago, Ill., a corporation of Illinois Application January 26, 1952, Serial No. 268,378

14 Claims. (Cl. 74—1)

This invention relates to force responsive control mechanism and more particularly to a mechanism responsive to a function of a condition to be measured or controlled to produce an output force proportional to the changes in the condition.

Fluid pressure transmitters of the type described and claimed in the patent to Rosenberger No. 2,431,200, have heretofore been utilized and have functioned very satisfactorily for their intended purposes. Such transmitters, however, are capable of developing only relatively small output pressures which must be utilized to operate an auxiliary receiving device when a movement proportional to changes in a condition is required. Furthermore, because of the small forces available in such transmitters, it is difficult to obtain an output which is directly proportional to the condition when the function of the condition which is measured is nonlinear. For example, in measuring flow by the drop across an orifice it is difficult to obtain an output pressure which is directly proportional to the flow.

It is accordingly one of the objects of the present invention to provide a control mechanism in which relatively large output forces are made available without interfering with the sensitivity of the mechanism.

Another object is to provide a control mechanism in which motor means operated in response to the output forces is utilized to rebalance the sensing element so that movement of the motor means is always accurately proportional to the force exerted by the sensing element.

According to one feature of the invention, the motor means comprises a cam shaped according to any desired function and acting through a spring to rebalance the sensing element so that the cam position may be made directly proportional to the value of the condition to be measured, even though the forces exerted by the sensing element are related in a nonlinear manner to the condition.

A further object is to provide a control mechanism in which the sensing element controls a first device which produces a regulated force proportional to the function of the condition and the regulated force controls a second device which produces an output force proportional to but larger than the regulated force to operate the motor means. In this way a large force is made available to operate the motor means without interfering with the sensitivity of the sensing element.

A still further object is to provide a control mechanism in which means are provided to produce a force proportional to the rate of movement of the motor means and which act on one of the force producing devices to prevent overshooting or hunting.

Preferably said means acts on the second device where any friction or spring effect cannot interfere with the sensitivity of the mechanism, but it may, under some conditions act directly on the sensing element.

The above and other objects and advantages of the invention will be more readily apparent when read in connection with the accompanying drawings in which:

Figure 1 is a diagrammatic view with parts shown in section of a control mechanism embodying the invention; and Figure 2 is a partial similar diagrammatic view illustrating an alternative arrangement.

The mechanism as shown in Figure 1 comprises a balance beam 10 which is pivoted at 11 on a housing 12. The end of the beam 10 may extend into the housing through a flexible seal and may be connected to a sensing element such as a diaphragm mounted within an enlarged extension 13 of the housing. The extension 13 may be connected through conduits 14' to different pressure sources, such as the opposite sides of an orifice, in a flow conduit, when flow is to be measured. For measurement of pressure only the lower connection 14' would be utilized, connected to the source of pressure to be measured. For measurement of other conditions, different pressures responsive to the functions of the conditions might be transmitted to the diaphragm chamber or in some cases the housing extension 13 might contain other types of sensing elements such as electrical coils to exert a force proportional to a function of the condition on the beam 10 tending to rock it in a clockwise direction.

The beam 10 is preferably threaded at its outer end to receive a threaded collar 14, whose position lengthwise of the beam can be adjusted. The collar 14 engages the free end of a lever 15 pivoted at 16 and which has a tension spring 17 connected thereto to urge it upwards. When the spring tension is proportional to the force exerted by the sensing element in the same ratio as the ratio of the leverage provided by the beam 10 and lever 15, the mechanism is in balance. Upon any change in the condition, the beam 10 will tend to move in one way or the other until the tension of the spring 17 is readjusted to balance it.

Unbalance of the beam 10 controls a first pressure producing device which is illustrated as a valve couple of the supply and waste type. The valve couple includes a nozzle 18 mounted adjacent to the end of the lever 15 to be variably restricted as the lever moves toward and away from it. The nozzle 18 is supplied with air through a conduit 19 containing a restriction 21 so that the pressure in the valve will be varied as the lever 15 moves relative to it.

The nozzle 18 is connected through a conduit 22 to a fluid motor 23 which may be an open casing closed by a flexible diaphragm 24. The diaphragm 24 is connected to a lever 25 which is pivoted at 26 and which forms a part of a second pressure producing device. The lever 25 is urged upward by a spring 27 so that it will tend to assume a position proportional to the pressure exerted on the diaphragm 24 and will move toward and away from a nozzle 28. The nozzle 28 is supplied with air under pressure through a restriction 29 and the pressure behind the nozzle is transmitted through a conduit 31 to a second fluid motor 32.

The motor 32 is also illustrated as a diaphragm type motor having a flexible diaphragm 33 urged upward by the pressure in the motor 32 and urged downward by a spring 34. The diaphragm 33 will therefore move to a position corresponding to the pressure transmitted to it from the nozzle 28.

The diaphragm is connected through a rod 35 to a gear segment 36 which is geared to a cam 37. The cam acts on a lever 38 which is pivoted at 39 and the free end of which is connected to the spring 17 to adjust the spring tension as the cam 37 is turned. It will be understood that the cam 37 may be given any desired shape to compensate for non-linear characteristics of the sensing system. For example where flow is being measured by measuring the drop across an orifice, the cam 37 would be a square cam to compensate for the square effect of the orifice. Thus, the position of the cam will correspond linearly to changes in flow and can be taken as a direct measure of the flow. For other conditions having different types of characteristics, the cam can be given a corresponding shape so that in all cases its position will accurately represent the value of the condition. Therefore movement of the cam can be utilized to operate a linear type of indicating or control device such for example as by adjusting a potentiometer or the like, in an electrical control system.

In order to prevent overshooting and hunting in the mechanism, a velocity feed back system is provided. As shown, this system comprises a cylinder 41 adapted to contain liquid and having a piston 42 slidable therein. The piston is connected through a rod 43 to an arm 44 which is rigid with the segment 36 so that the piston will be moved an amount proportional to movement of the motor diaphragm 33, and the cam 37, and at a speed proportional to the speed of adjustment thereof. The lower end of the cylinder 41 is connected through a conduit 45 to a fluid motor shown as including a fixed cylinder 46 in which a piston 47 is slidable. When the piston 42 is moved with the system full of liquid, a corresponding movement will be imparted to the piston 47. To make the system velocity responsive a controlled bypass or leak is provided therein so that the pressure which moves the piston 47 will gradually dissipate itself and the force exerted by the piston 47 will disappear. As shown, this leak or bypass is provided by a bypass connection 48 between the ends of the cylinder 41 which can be adjusted through a valve 49 to obtain the desired velocity effect.

In the preferred construction, as shown in Figure 1, the piston 47 is connected directly through a piston rod 51 to the lever 25. The advantage of this construction is that any friction or spring effects in the cylinder 46 and piston 47 act only on the lever 25 and do not interfere in any way with movement of the beam 10. Under some conditions however, where a more rapid action is desired and where friction or spring effects are not disadvantageous, the piston rod 51 of the piston 47 may be connected directly to the lever 15 as shown in Figure 2.

In the construction of the device, the supply and waste type valves may be designed to produce maximum gain which is made possible because the function of the valves does not interfere with sensitivity of the beam 10. If an extremely large valve were utilized at 18 in an attempt to obtain the desired pressure in a single valve couple, relatively large movements of the lever 15 would be required and the nozzle pressure acting through a relatively large nozzle area on the beam 10 would produce an appreciable effect. With the present construction, the nozzle 18 can be made of the usual size and the nozzle 28 can be made relatively larger so that the output pressure transmitted to the motor 32 can be extremely large and there will still be no interference with the sensitivity of the mechanism.

In operation, assuming that the pressure on the sensing element increases, tending to rock the beam 10 clockwise, the lever 15 will be moved downward toward the nozzle 18 to increase its pressure. This will increase the pressure on the motor 23 to move the lever 25 toward the nozzle 28 and effect a very substantial increase in pressure on the motor 32. The motor 32 will now move upward, rocking the segment 36 clockwise and turning the cam 37 counterclockwise to raise the lever 38 and increase the tension of the spring 17 to rebalance the beam 10. The movement of the cam and gear segment will be directly proportional to the amplitude of the change in condition so that the position of the cam will be representative of the new value of the condition. At the same time, the rate of adjustment of the cam will be proportional to the amount of change of the condition, a more rapid adjustment being produced for larger than for smaller changes because of the greater movement of the valve couples in response to a larger change.

When the segment 36 moves clockwise it moves the piston 42 downward to increase the pressure acting on the piston 47. This piston tends to move upward to move the lever 25 away from the nozzle 28. The pressure produced by the nozzle 28 will therefore be smaller than it otherwise would be so that the motor 32 will not move as far as it otherwise would move. The pressure acting on the piston 47 is gradually dissipated through the bypass 48 so that the lever 25 will finally assume a position corresponding accurately to the pressure in the nozzle 18. If the adjustment is not correct at this time a further adjusting operation will be performed in the same manner until the position of the cam 37 accurately corresponds to the condition and until the tension on the spring 17 accurately balances the sensing element. When the valve 49 is properly adjusted, the mechanism will move rapidly and accurately to a position of balance without overshooting or hunting.

The construction of Figure 2 functions in the same manner except that here the piston 47 acts directly on the lever 15 to reduce the pressure in the nozzle 18. Reduced pressure in the nozzle 18 will reduce the pressure acting on the lever 25 and will stop the motor 32 before it would otherwise stop. This construction produces the same effect with respect to elimination of overshooting or hunting in a slightly different manner than that shown in Figure 1. It will be noted that in the above cases the rebalancing effect exerted by the piston 47 is responsive ony to the rate of adjustment of the cam and the motor 32 and disappears in a short time without leaving any residual force which would affect the accuracy or sensitivity of the mechanism.

While two embodiments of the invention have been shown and described in detail, it will be understood that these are illustrative only and are not to be taken as a definition of the scope of the invention, reference being had for this purpose to the appended claims.

What is claimed is:

1. A force responsive control mechanism comprising a balance member, means responsive to a condition to be measured to exert a force in one direction on the balance member, adjustable means to exert a force in the opposite direction on the balance member, a device responsive to unbalance of the balance member to produce a regulated force proportional to the unbalance, a second device responsive to the regulated force to produce an output force larger than but proportional to the regulated force, means responsive to the output force to adjust the adjustable means thereby to balance the balance member, a device operably connected to the last named means to produce a force proportional to the rate of adjustment of the adjusting means, and a device responsive to the last named force and connected to one of the first two named devices.

2. The construction of claim 1 in which the last named device is connected to the second device and acts thereon in a direction opposite to the regulated force.

3. The construction of claim 1 in which the last named device is connected to the first named device and acts thereon in a direction opposite to the balance member.

4. A force responsive control mechanism comprising a balance member, means responsive to a condition to be measured to exert a force in one direction on the balance member, adjustable means to exert a force in the opposite direction on the balance member, a device responsive to unbalance of the balance member to produce a regulated force proportional to the unbalance, means responsive to the regulated force to adjust the adjustable means thereby to balance the balance member, a device connected to the last named means to produce a force proportional to the rate of adjustment of the adjustable means, and means responsive to the last named force connected to the balance member and acting thereon in a direction opposite to its unbalance.

5. A force responsive control mechanism comprising a balance member, means responsive to a condition to be measured to exert a force in one direction on the balance member, adjustable means to exert a force in the opposite direction on the balance member, a device responsive to unbalance of the balance member to produce a regulated force proportional to the unbalance, a second device responsive to the regulated force to produce an output force proportional to but larger than the regulated force, means responsive to the output force to adjust the adjustable means thereby to balance the balance member, a liquid dashpot including a cylinder, a piston in the cylinder connected to the last named means to be moved thereby, and a restricted bypass around the piston, an expansible fluid motor connected to one of said devices, and a fluid connection from the dashpot cylinder to the fluid motor.

6. A force responsive control mechanism comprising a balance member, means responsive to a condition to be measured to exert a force in one direction on the balance member, adjustable means to exert a force in the opposite direction on the balance member, a device responsive to unbalance of the balance member to produce a regulated force proportional to the unbalance, a second device responsive to the regulated force to produce an output force proportional to but larger than the regulated force, means responsive to the output force to adjust the adjustable means thereby to balance the balance member, a liquid dashpot including a cylinder, a piston in the cylinder connected to the last named means to be moved thereby, and a restricted bypass around the piston, an expansible fluid motor connected to the second device, and a fluid connection from the dashpot cylinder to the fluid motor whereby the fluid motor will oppose action of the regulated pressure on the second device in response to fluid pressure developed in the dashpot.

7. A force responsive control mechanism comprising a balance member, means responsive to a condition to be measured to exert a force in one direction on the balance member, adjustable means to exert a force in the opposite direction on the balance member, a device responsive to unbalance of the balance member to produce a regulated force proportional to the unbalance, a second device responsive to the regulated force to produce an output force proportional to but larger than the regulated force, means responsive to the output force to adjust the adjustable means thereby to balance the balance member, a liquid dashpot including a cylinder, a piston in the cylinder connected to the last named means to be moved thereby, and a restricted bypass around the piston, an expansible fluid motor connected to the balance member, and a fluid connection from the dashpot cylinder to the fluid motor whereby the fluid motor will oppose unbalance of the balance member in response to fluid pressure developed in the dash pot.

8. A force responsive control mechanism comprising a balance beam, means responsive to a condition to be measured to urge the beam in one direction, adjustable means to exert a balancing force in the opposite direction on the beam, a valve couple of the supply and waste type to produce a regulated pressure in response to unbalance of the beam, a second valve couple of the supply and waste type to produce an output pressure, a fluid motor responsive to the regulated pressure acting on the second valve couple in a direction to increase the output pressure, a spring acting on the second valve couple in opposition to the fluid motor, a second fluid motor responsive to the output pressure and connected to the adjustable means to adjust it thereby to rebalance the beam, and means responsive to the rate of movement of the second fluid motor connected to one of the valve couples to exert a force thereon opposite to the unbalanced force acting thereon.

9. A force responsive control mechanism comprising a balance beam, means responsive to a condition to be measured to urge the beam in one direction, adjustable means to exert a balancing force in the opposite direction on the beam, a valve couple of the supply and waste type to produce a regulated pressure in response to unbalance of the beam, a second valve couple of the supply and waste type to produce an output pressure, a fluid motor responsive to the regulated pressure acting on the second valve couple in a direction to increase the output pressure, a spring acting on the second valve couple in opposition to the fluid motor, a second fluid motor responsive to the output pressure and connected to the adjustable means to adjust it thereby to rebalance the beam, a cylinder mounted adjacent to the second fluid motor, a piston in the cylinder connected to the second fluid motor to be moved thereby, a third fluid motor in fluid communication with the cylinder to produce a force proportional to the rate of movement of the piston, there being a restricted leak in the fluid system formed by the cylinder and piston and the third fluid motor to dissipate fluid pressure produced by movement of the piston, and a connection from the third fluid motor to one of the valve couples.

10. The construction of claim 9 in which the third fluid motor is connected to the first named valve couple to oppose the action of the balance beam thereon.

11. The construction of claim 9 in which the third fluid motor is connected to the second valve couple to oppose the action of the first named fluid motor thereon.

12. A force responsive control mechanism comprising a balance beam pivoted on a fixed pivot, means responsive to a condition to be measured to urge the beam in one direction, a spring connected to a movable anchor member and to the beam urging the beam in the other direction, a cam movable to move the anchor member thereby to adjust the spring tension, a device responsive to unbalance of the beam to produce a regulated force, a second device responsive to the regulated force to produce an output force larger than the but proportional to the regulated force, and motor means responsive to the output force to move the cam.

13. A force responsive control mechanism comprising a balance beam pivoted on a fixed pivot, means responsive to a condition to be measured to urge the beam in one direction, a spring connected to a movable anchor member and to the beam urging the beam in the other direction, a cam movable to move the anchor member thereby to adjust the spring tension, a device responsive to unbalance of the beam to produce a regulated force, a second device responsive to the regulated force to produce an output force larger than the but proportional to the regulated force, motor means responsive to the output force to move the cam, and mechanism moved by the motor means to produce a force proportional to the rate of movement of the motor means and acting on one of the devices in opposition to the initial controlling force acting thereon.

14. A force responsive control mechanism comprising a balance beam pivoted on a fixed pivot, means responsive to a condition to be measured to urge the beam in one direction, a spring connected to a movable anchor member and to the beam urging the beam in the other direction, a cam movable to move the anchor member thereby to adjust the spring tension, a device responsive to unbalance of the beam to produce a regulated force, a second device responsive to the regulated force to produce an output force larger than the but proportional to the regulated force, motor means responsive to the output force to move the cam, and mechanism moved by the motor means to produce a force proportional to the rate of movement of the motor means and acting on the second device in opposition to the regulated force.

References Cited in the file of this patent

UNITED STATES PATENTS

| Number | Name | Date |
|---|---|---|
| 1,782,832 | Smoot | Nov. 25, 1930 |
| 2,195,351 | Ziebolz | Mar. 26, 1940 |
| 2,202,218 | Mallory | May 28, 1940 |
| 2,296,714 | Ibbot | Sept. 22, 1942 |
| 2,408,685 | Rosenberger | Oct. 1, 1946 |